United States Patent [19]

Eysel et al.

[11] 4,224,846
[45] Sep. 30, 1980

[54] TURNING BORING HEAD WITH A TOOL FOR RADIAL ADJUSTMENT

[75] Inventors: Dieter Eysel, Maintal; Wilfried Gerk, Rödermark, both of Fed. Rep. of Germany

[73] Assignee: Firma Samson Aktiengesellschaft, Fed. Rep. of Germany

[21] Appl. No.: 7,369

[22] Filed: Jan. 29, 1979

[51] Int. Cl.³ .................... B23B 29/00; B23B 41/00; B23B 51/00

[52] U.S. Cl. .................... 82/36 R; 408/147; 408/150; 408/180; 82/1.2

[58] Field of Search .......... 82/1.2, 1.4, 1.5, 36 R; 408/147, 150, 151, 152, 154, 156, 180

[56] References Cited

U.S. PATENT DOCUMENTS

| 3,422,705 | 1/1969 | Nahodil et al. | 408/147 |
|---|---|---|---|
| 3,526,159 | 9/1970 | Robinson et al. | 408/147 |
| 3,884,590 | 5/1975 | Skrenther et al. | 408/150 |
| 3,902,386 | 9/1975 | Dressler | 82/1.4 |
| 3,941,497 | 3/1976 | Ballini | 408/180 |
| 3,966,347 | 6/1976 | Watson | 408/180 |

FOREIGN PATENT DOCUMENTS

| 432984 | 10/1974 | U.S.S.R. | 408/156 |
|---|---|---|---|
| 596381 | 8/1976 | U.S.S.R. | 408/156 |

*Primary Examiner*—Harrison L. Hinson
*Attorney, Agent, or Firm*—Watson, Cole, Grindle & Watson

[57] ABSTRACT

A turning boring head or the like has a tool, designed for radial adjustment, and whose tool support is able to undergo feed motion, using liquid power into a position dependent on the desired size of the bore being machined. The bore rod body has not only a pressure medium powered tool support designed for fine positioning of the fine-adjustment cutting tool, but furthermore at least one further tool support for a further cutting tool.

6 Claims, 6 Drawing Figures

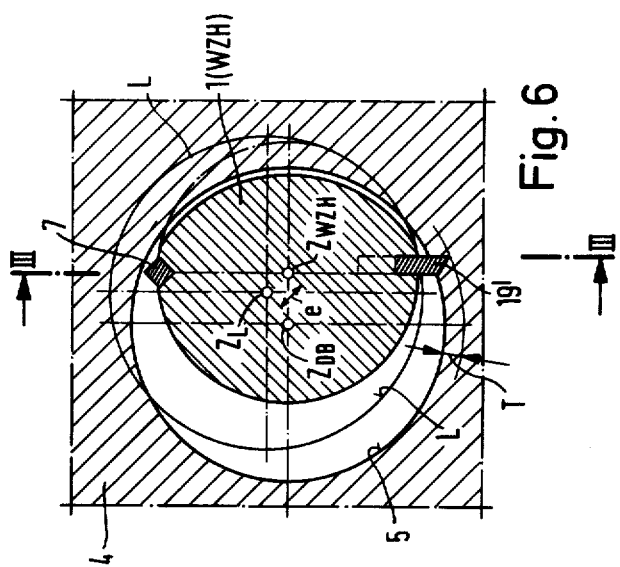
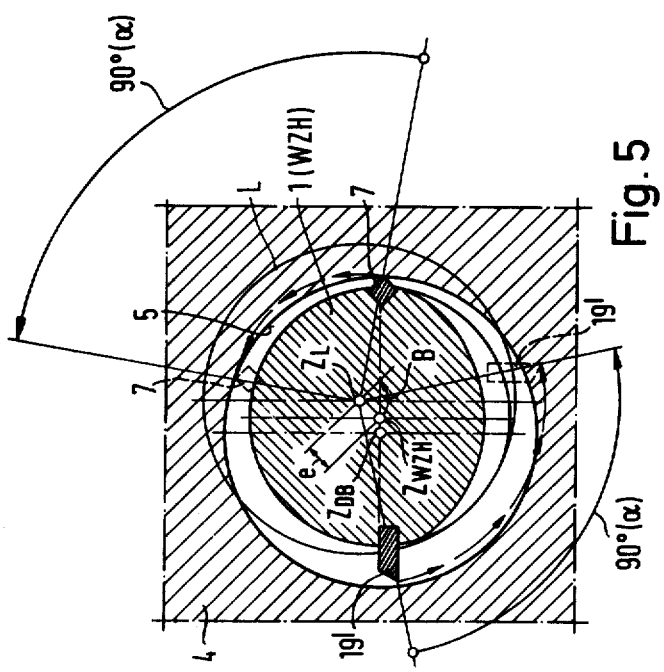

TURNING BORING HEAD WITH A TOOL FOR RADIAL ADJUSTMENT

BACKGROUND OF THE INVENTION

(1) Field of the Invention

The invention relates to a turning boring head or the like with a bit, placed on the boring rod body for feed radially with respect to the long-axis of the boring head, and whose tool support is designed for feed using a driving piston, powered by a controlled pressure medium, in a way dependent on the desired value of a bore diameter.

(2) The Prior Art

A suggestion has been made for such a boring head in the German specification (Auslegeschrift) No. 2,034,601. This boring head is generally complex in design and only makes possible the fine feed of a single cutting tool or bit. While it is true that suggestions have been made for boring tools with two or more bits, the bits are not designed for fine feed and, in fact, are fixedly supported on the bore rod body.

SHORT OUTLINE OF THE INVENTION

One purpose of the present invention is that of increasing the machining output or efficiency of boring heads of the sort noted with simple structures, needing little space, and making possible a wider range of use of such boring heads.

These and other purposes are effected by the invention in that the boring rod body, in addition to a pressure medium powered fine feed tool support for the fine feed cutting tool has at least one further tool support for a further cutting tool.

With such a design a single inward motion of the boring rod body into the bore of a workpiece with the unmoving boring tool is responsible for roughing or coarse smoothing of the cylinder face of the bore to be machined, and then on moving the boring rod body out of the bore, the necessary fine machining to the desired end size may take place with the fine feed cutting tool. In this respect, as well, any wear of the cutting tools or bits may be balanced with the help of the fine feed system.

Every further cutting tool may be supported by a fixed-adjustment tool support at the periphery of the boring rod body. However, it may furthermore be placed on each of a number of pressure medium powered tool supports and, in this way, undergo fine feed as well.

The tool support, or each such tool support, able to undergo adjustment, may in the invention be worked by a liquid-powered driving piston, which is controlled by the air-powered piston of air-liquid power pressure transducer.

In a further development of the invention, the boring head may be so designed that the boring rod body has, in addition to a fine-feed cutting tool or bit, at least one further cutting tool, which is designed for fine-feed and, furthermore for radial motion by a fixed amount. Such a boring tool is of specially good effect for making grooves or the like, whose diameter has to be very exact. This boring head may for use be designed in such a way that the long-axle of the boring rod body, or bit support, is spaced from the axis of the boring head or the driving spindle and, is in fact able to be moved parallel to it through a distance of some millimeters. This may be effected with the help of a rack which is best machined into a part of a fluid-powered piston and cylinder unit, or joined with it in some other way, and which may be used for positioning the eccentrically supported boring rod body into two fixed positions. In one of these positions, the cutting tool is positioned or fixed as near as possible to the work axis and in the other position it is as far as possible from it. In one form of this part of the invention of specially good effect, the stop of the adjustment unit is not fixed but designed for fine-adjustment. Furthermore the two fixed positions of the driving rod may be used in the invention for causing, in one fixed position, the cutting tool to be used in connection with the fine-adjustment stop, while in the other fixed position, a cutting tool or bit is used, which is only needed for the first, rough part of machining. Furthermore it is possible using the invention to have fine-adjustment parts for the two end positions and, because of this, to have machining of different diameters in the work.

For example with such a boring tool with the one cutting tool or bit is possible for a bore to be machined in one feed direction, while, for fine machining of a second face, a second cutting tool is used on backward movement of the boring head. In this way different groupings of cutting tools are possible in the invention.

LIST OF FIGURES

Different working examples of the invention will be seen in the Figures.

FIG. 5 is a diagrammatic section taken along line V—V of FIG. 3, the grooving tool being shown in the waiting position.

FIG. 6 is a diagrammatic section similar to FIG. 5, with, however, the grooving tool being shown in the groove-machining position.

ACCOUNT OF WORKING EXAMPLES OF THE INVENTION

Figure 1:
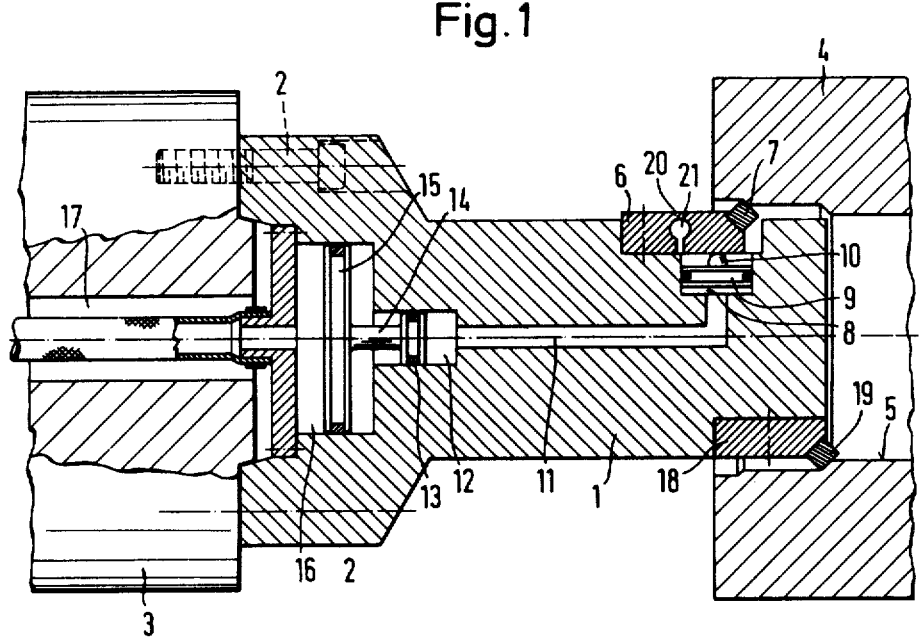
FIG. 1 is a diagrammatic longitudinal-section of a boring head with a fine-adjustment and a fixed-adjustment cutting tool.

The boring head has a boring rod body or tool support 1, which, using screws in holes 2, is joined with a boring head flange 3, which may take the form of the driving spindle of the machine tool. The work 4 to be machined has a bore 5, into which the boring rod body 1 may run in the axial direction.

At the periphery of the front part of the boring rod body 1, there is a fine-adjustment tool support 6, whose free, springing part takes the form of a support for a cutting tool or a bit 7. Under the free springing part of the tool support 6, there is a pressure medium cylinder 8, which is placed in the boring rod body 1 and in which a driving piston 9 is placed for motion as desired. On the top face of the driving piston 9, there is a driving nosepiece 10 acting upwards against the free springing part of the tool support 6. The lower side of the driving piston 9 is acted upon by a driving liquid such as oil.

The pressure medium cylinder 8 is joined by way of a pressure medium line 11 with the pressure liquid cylinder 12 of an air-liquid power pressure transducer, whose liquid piston 13 is joined by way of a bar 14 with an air piston 15, very much greater in size and which, for its part, is placed in a pressure medium cylinder 16 for axial motion. The pressure medium cylinder 16 is joined by way of a pressure line 17 with an air signal producer, used for controlling the motion of the air piston dependent on a certain desired value of the bore diameter of the work 4 to be produced with the help of the air pressure.

Opposite to the fine-adjustment tool support 6, there is on the periphery of the boring rod body 1, a fixed-adjustment tool support or rest 18, on which a cutting tool or bit 19 is fixed, which is used for roughing or for the first part of a smoothing operation in the work bore 5. The roughing of the bore takes place on forward motion of the boring head, while fine machining of the bore 5 is undertaken on backward motion of the boring head using the fine-adjustment cutting tool 7.

Figure 2:
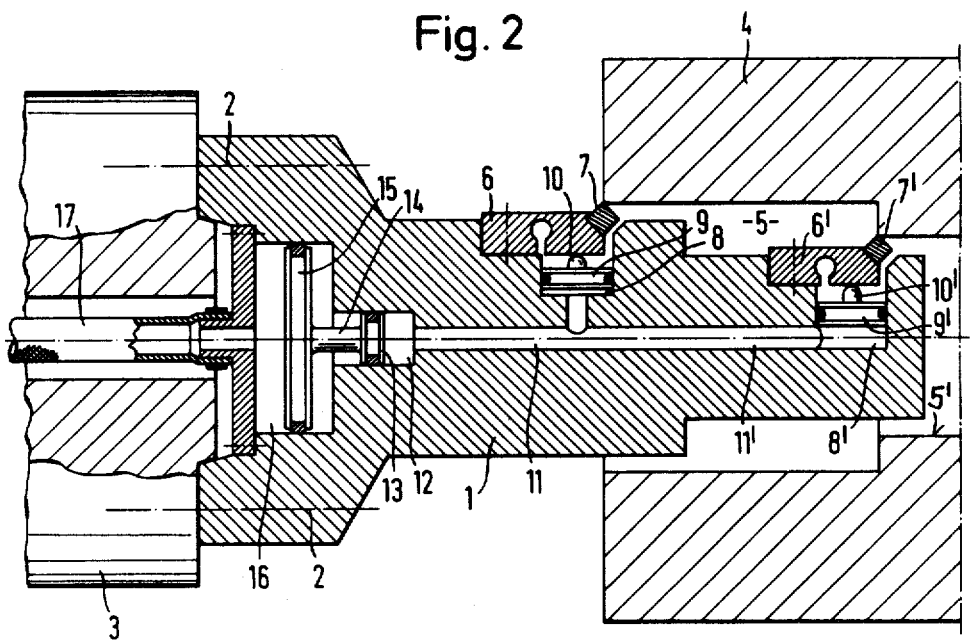
FIG. 2 is a view of a boring head like that of FIG. 1 but, however, with two adjustable cutting tools.

The form of the invention to be seen in FIG. 2 is different from that of FIG. 1 in that in place of the further unmoving or fixed-adjustment cutting tool, one or more fine-adjustment tool supports 6' with a cutting tool or bit 7' are placed at the periphery of the boring rod body 1, for example, in the direction of forward motion, in front of the first fine-adjustment tool support 6. The freely springing part, supporting the tool 7', of the second tool support 6' is acted upon, like the first tool support 6, by a driving piston 9', whose pressure medium cylinder 8' is joined with a pressure medium line 11'. The line 11' can, in this working example of the invention, simply be a further part of the pressure line 11, although, however, it might be placed separately and joined with the pressure liquid cylinder of one or more air-liquid power transducers. The first fine-adjustment cutting tool 7 may in this way be used for fine machining of the bore or cylinder face 5, while the second or other fine-adjustment cutting tool 7' is used for fine machining of an other coaxial bore or cylinder face 5'.

Such a boring head may, as part of the invention, be used for further cutting tools or bits in addition, for example in such a way that for each of the coaxial holes or cylinder faces with different diameters, a fixedly-positioned rough machining bit and a fine-adjustment fine machining bit are used, for example on the same lines as FIG. 1. So in this case the boring head would have four cutting tools, namely two tools with fine-adjustment and two tools fixed in their adjustment. The elastically springing tool support 6 or, in the other case, 6', may in a simple way be made up of a plate, whose part, fixed to the periphery of the boring rod body 1, is joined with a freely springing part, positioning the cutting tool 7 or 7', by a springing bridge 20 with the necessary form, the bridge being formed in the plate with the help of a hole 21 which, by way of example, takes the form of a keyhole.

In the working example of the invention of FIGS. 3 to 6, it is possible for the apparatus to machine not only smooth cylinder bores as noted, but also to cut grooves and machine them to the desired size. For the last-named operation, there is a chance of producing deep or great feed amounts using an eccentric driving unit, the depth of machining, that is to say the groove depth being able to undergo adjustment by air power.

To this end the apparatus may be so designed that when the grooving tool 19' is cutting the work, the bore machining tool 7 is clear of the work.

To this end in a rest 25 a bearing pin 1' is supported in bearings 40 and positioned in a sideways direction by shoulders 41 and 42. This bearing pin 1' is responsible for supporting the tool support 1 (WZH), so that the last-named is eccentric (e) in relation to bearing pin 1'. At its free end the tool support 1 has the machining tools 7 and 19'.

Figure 3:
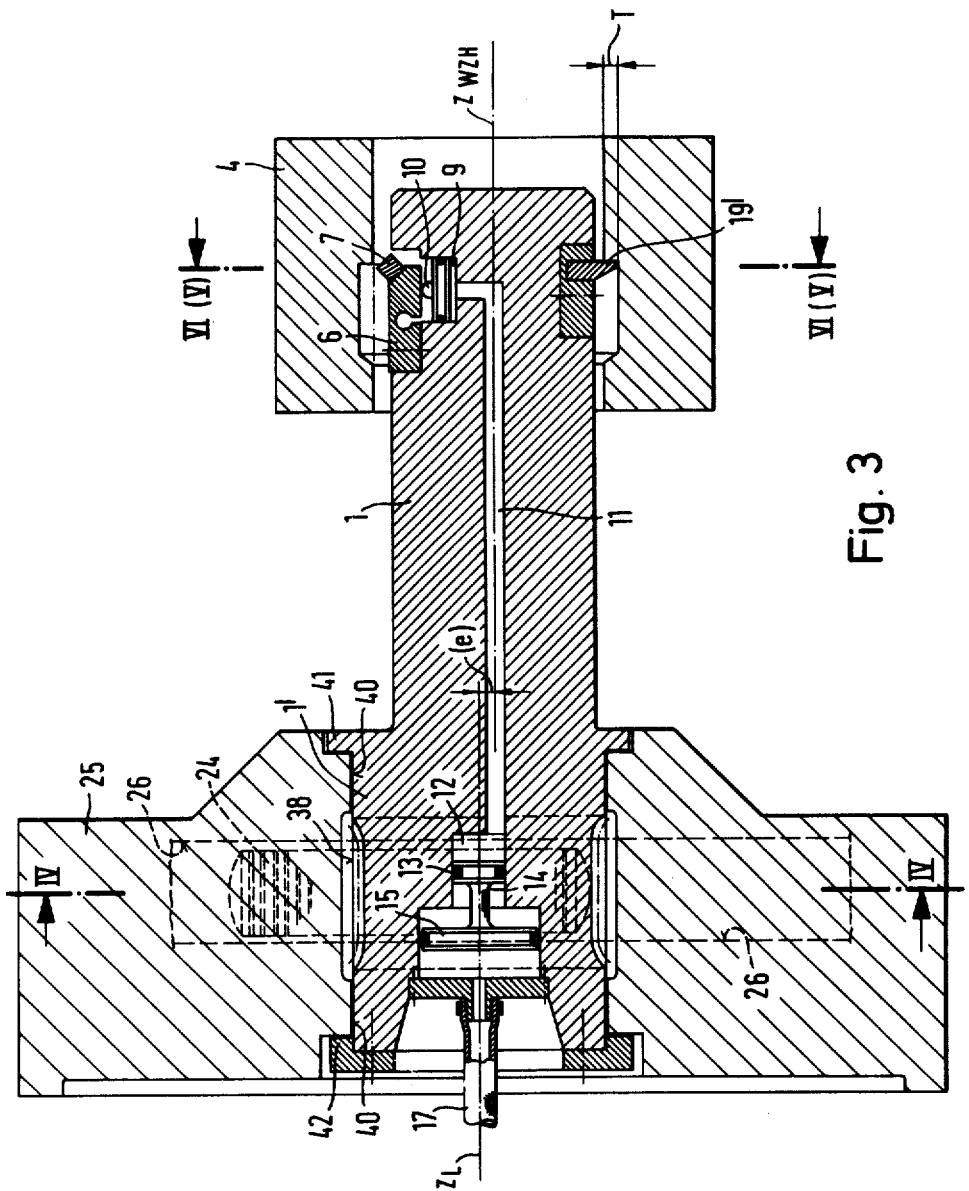
FIG. 3 is a longitudinal-section taken along line III—III of FIG. 4 presenting a rough view of a boring head like that of FIG. 1 with an eccentrically adjustable boring rod.
Figure 4:
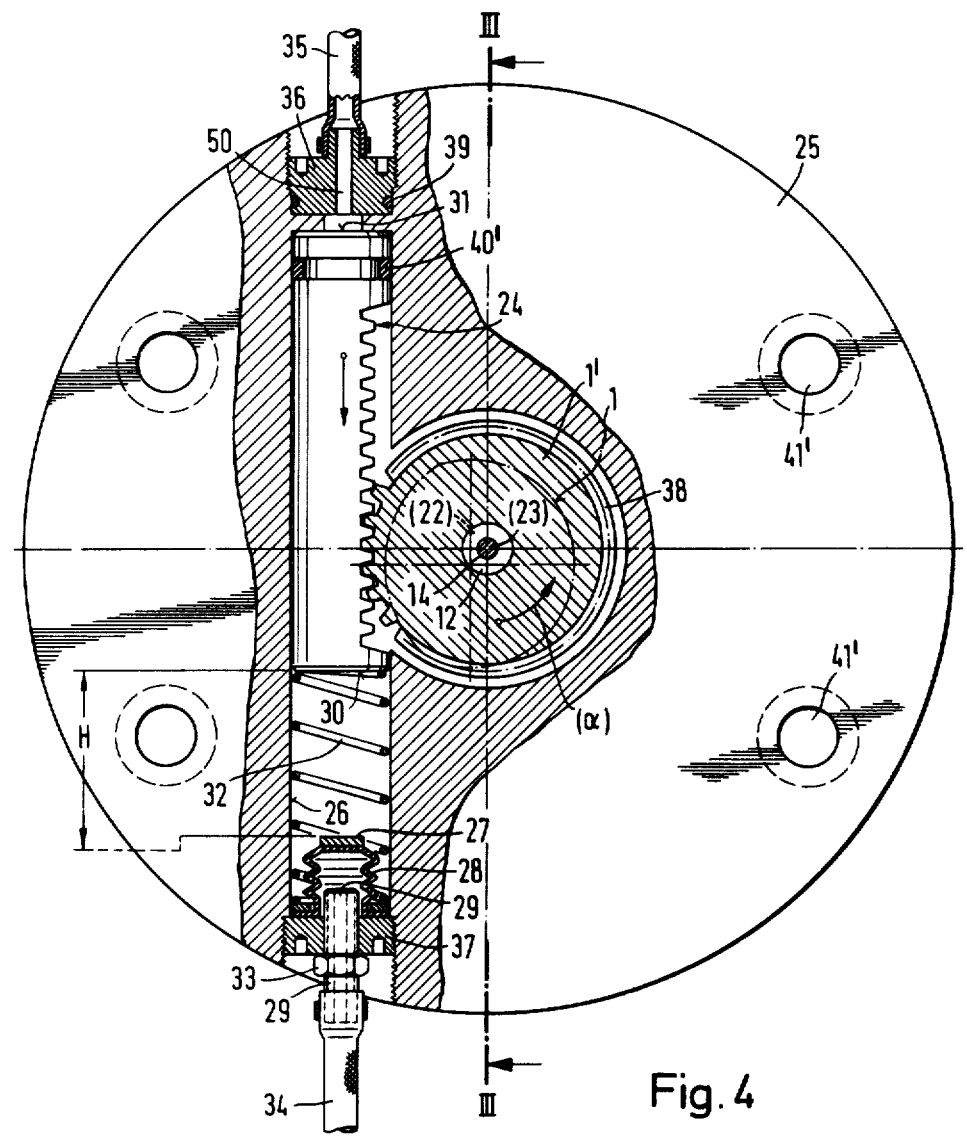
FIG. 4 is a view of the boring head of FIG. 3 is a partly broken away cross-section taken along line IV—IV of FIG. 3.

The bearing pin 1' may, as seen in FIGS. 3 and 4, undergo feed using a rack 24 and a pinion 38, which may be produced by machining into the bearing pin 1', the feed motion being a turning motion. In this respect the middle point $Z_{WZH}$ of the tool support 1, as more clearly seen in FIG. 5, is moved along a curve or arc B, the grooving tool 19' cutting into the face of the bore 5 of the work 4 (FIG. 6). At the same time by the necessary placing (in this case diametral placing), the tool 7 is moved clear of the work 4 in the bore 5 in an inward direction (FIG. 6). The desired groove depth T (FIGS. 3 and 6) may more specially undergo adjustment by the air controlling system.

The driving system for the motion into position of the tool 19' will now be described. By way of line 35 a driving liquid under pressure as for example oil or air is forced through the bore 50 of a connection piece 36 (see FIG. 4), for acting on the end face 31 of a rack 24 taking the form of a piston, which is guided in a cylinder 26. Now the rack 24 is moved against the force of a spring 32, so that the pinion 38 is moved. Then the pin 1' in the bearing 40 is turned through a certain angle α. Because of the eccentric positioning e of the tool support 1 in relation to the pin 1', the middle point $Z_{WZH}$ of the tool support 1 is moved along the curve or arc B noted earlier, see FIG. 5, which is dependent on the feed motion of the tool 19' in relation to the hole 5 in the work 4. On this feed motion, the rest 25 will be turned with the tool support 1.

Backward motion takes place on the same lines. It only being necessary for the pressure oil or air to be let off at 35, so that the spring 32 will be responsible for turning back of the pinion 38. In FIG. 4 the seals for the parts 36 and 24 are numbered 39 and 40', while the fixing holes for the rest 25 are numbered 41'.

In some cases it may be of good effect for the same apparatus to be used for producing different groove depths T or, possibly, going as far as these depths in more than one working cut or step. This may take place as part of the operation. An adjustable stop 27 serves for fixing the motion H (FIG. 4). For this purpose only a certain turning of the pin 1' through the angle α is possible, which is then equal to the desired feed depth T (FIG. 6). Adjustment of the stop 27 may take place using input of pressure oil or pressure air through line 34, a pipe connection 29 and a bellows 28. The pressure medium connection 29 is screwed into an inner screw part 37 and locked by a nut 33.

The feed of the fine-adjustment tools 7 and 7' and of the stop bellows 28 takes place very precisely. If, for example, the air-powered piston 15 is acted upon by a pressure of 0 to 4 atm., the liquid piston will be producing pressures of 0 to 200 bar. At an oil pressure of 200 bar the piston 9 or 9' and the stop 27, will be moved through, for example, 0.2 mm.

The springing tool support 6 or the stop bellows 28 is so stiff, that it only becomes longer by this amount, when the pressure undergoes a change from 0 to 200 bar.

The center point of the bearing 40 is lettered $Z_L$ in FIGS. 3, 5 and 6. The bearing is diagrammatically viewed at L in FIGS. 5 and 6. The middle point of the through hole 5 is lettered $Z_{DB}$.

We claim:

1. A boring head having a boring axis and at least one bit disposed on the boring head for feed radially relative to said axis, the boring head having at least one elastic deformable bit holder provided for feed by means of at least one pressure piece which is powered by a controllable pressure medium dependent on the desired value of a bore diameter, said pressure piece comprising a feed piston movably mounted in a feed cylinder disposed transversely to said axis, said feed piston being operated by a pressurized liquid contained in a hydraulic cylinder and a hydraulic line interconnecting said hydraulic cylinder and said feed cylinder, a hydraulic piston of a first diameter movable in said hydraulic cylinder for pressurizing said liquid, a pneumatic piston of a second diameter greater than said first diameter being coupled with said hydraulic piston and working in a pneumatic cylinder which is connected with a pneumatic signal producer.

2. The boring head according to claim 1, wherein said hydraulic piston and said pneumatic piston are interconnected by a piston rod.

3. The boring head according to claim 1, wherein pneumatic cylinder and said signal producer are interconnected by a pneumatic line, the boring head having a flange containing a central bore, said pneumatic line extending through said bore.

4. The boring head according to claim 1, wherein two bit holders are provided for feed by two pressure pieces having feed bylinders interconnected by said hydraulic line.

5. The boring head according to claim 1, wherein the ratio between said first and second diameters is such that a pneumatic pressure of 0 to 4 atmospheres acting against said pneumatic piston produces a hydraulic pressure within said hydraulic cylinder of 0 to 200 bore.

6. The boring head according to claim 1, including a bearing pin containing said axis and a tool support mounted on said bearing pin eccentrically relative to said axis, said tool support having a pinion gear thereon for engagement with a rack gear for rotation thereby a rack piston engageable with one end of said rack gear, a cylinder containing said rack gear for guiding same, a return spring bearing against the opposite end of said rack gear, an adjustable stop at said opposite end for determining the stroke of said rack gear, a bellows supporting said stop, and a pressure line communicating with said bellows for adjusting said stop.

* * * * *